United States Patent [19]
Dreher

[11] 3,856,615
[45] Dec. 24, 1974

[54] RESILIENT ENERGY ABSORBING ASSEMBLY

[75] Inventor: James Howard Dreher, Durham, N.H.

[73] Assignee: McCord Corporation, Detroit, Mich.

[22] Filed: Aug. 28, 1972

[21] Appl. No.: 284,317

[52] U.S. Cl.............. 161/168, 161/159, 267/140, 293/63, 293/71 R, 293/72, 293/88
[51] Int. Cl....... B32b 3/00, B32b 5/02, B60r 19/08
[58] Field of Search.......... 52/167, 716; 161/39, 77, 161/89, 96, 144, 159, 160, 161, 168, 170, 161/178, 5, 55, 60, 68, 69; 267/140, 141, 152, 161/153; 293/1, 71 R, 88, 63, 72

[56] References Cited
UNITED STATES PATENTS

| | | | |
|---|---|---|---|
| 1,974,279 | 9/1934 | Jones | 161/69 X |
| 2,493,032 | 1/1950 | Rheinfrank, Jr. | 161/69 |
| 2,706,112 | 4/1955 | Carrier, Jr. | 267/153 |
| 2,744,042 | 5/1956 | Pace | 161/68 X |
| 3,043,730 | 7/1962 | Adie | 267/153 X |
| 3,068,043 | 12/1962 | Komenda | 161/89 X |
| 3,473,836 | 10/1969 | Halter | 293/71 R X |
| 3,565,734 | 2/1971 | Shanok et al. | 161/5 |
| 3,644,168 | 2/1972 | Bonk et al. | 161/161 |
| 3,809,420 | 5/1974 | Weller | 293/70 |

FOREIGN PATENTS OR APPLICATIONS

| 96,263 | 6/1960 | Norway | 161/68 |
|---|---|---|---|

Primary Examiner—M. Henson Wood, Jr.
Assistant Examiner—Howard Beltran
Attorney, Agent, or Firm—McGlynn and Milton

[57] ABSTRACT

The instant invention provides an energy absorbing assembly including yieldable means and network means disposed at least partially within the yieldable means forming collapsible compartments; the network means including a plurality of spaced elongated means, link members for connecting adjacent elongated means, and joint means for facilitating relative angular movement between the link members and the elongated means wherein the collapsible compartments are compressed and thereby absorb energy.

29 Claims, 4 Drawing Figures

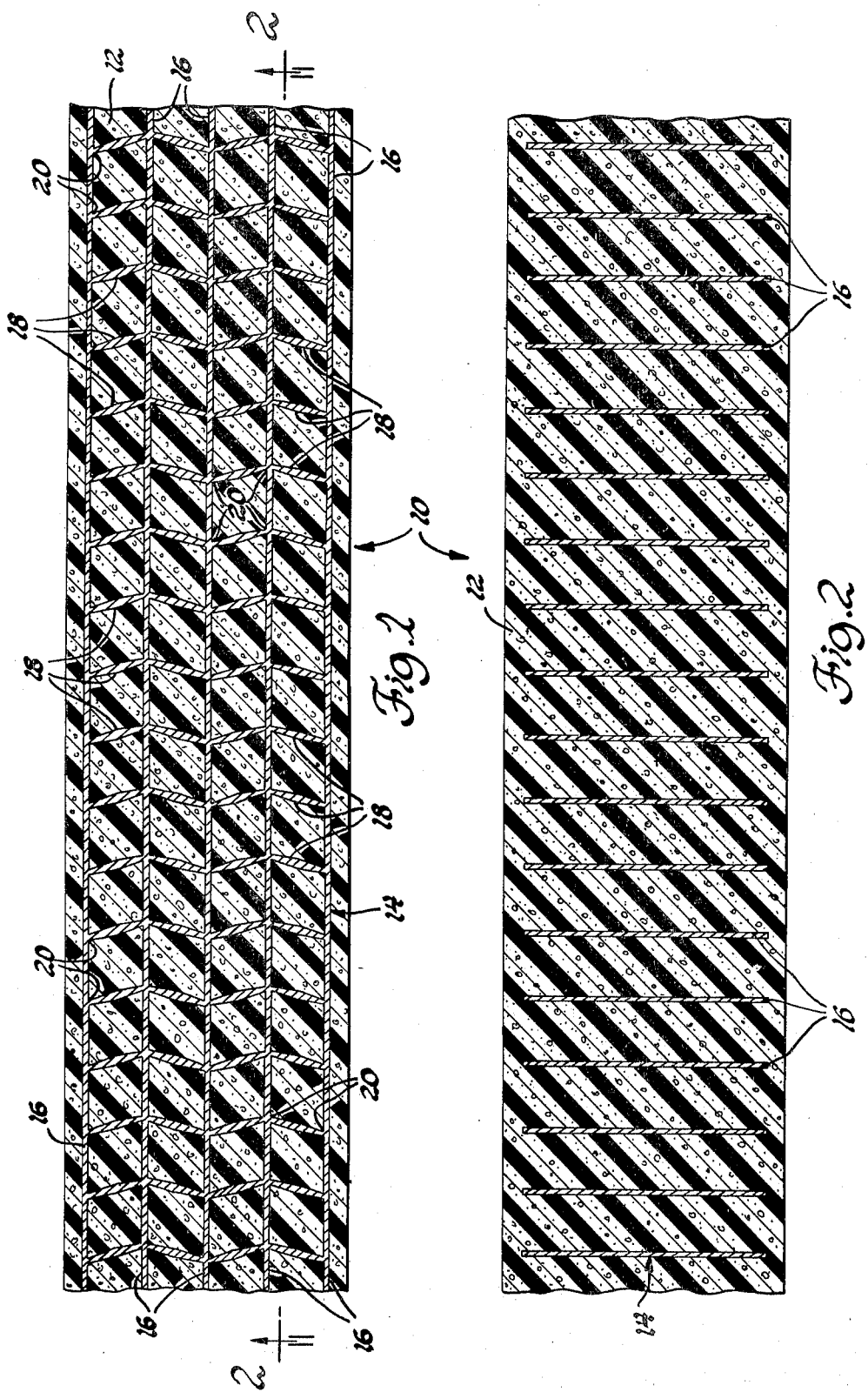

RESILIENT ENERGY ABSORBING ASSEMBLY

This invention relates to an energy absorbing bumper assembly of the type utilized in vehicles to render a vehicle more safe by absorbing energy upon impact of the vehicle bumper with a foreign object.

There are a great many types of energy absorbing bumper devices which include various energy absorbing means, the instant invention being directed specifically toward such devices which include yieldable means comprising, most commonly, an elastomeric material for absorbing energy.

The yieldable means is, of course, designed to absorb the energy of an applied force caused by the impact of a collision. In the past it has been found extremely beneficial to include additional means within the elastomeric material for absorbing energy along the entire length of the bumper material in response to a force applied only to a relatively small portion of the bumper. In other words, it is improtant that the applied force is distributed throughout a large volume of the energy absorbing material than that volume which is immediately under the area in contact with the applied force. The best known teaching of an energy absorbing bumper of this type is set forth in the patent application Ser. No. 158,918 filed Jul. 1, 1971, now U.S. Pat. No. 3,809,420 issued in the name of Peter A. Weller and assigned to the assignee of the subject application, and the instant invention is an improvement thereover. It has been discovered that the combination of a network embedded within an elastomeric material produces results not expected from the mere combining of a network and elastomeric material. For example, a given network collapsed under a 5 pound load while a given elastomeric material collapsed under a 300 pound load yet when the network was embedded into the elastomeric material a 600 pound load was required under the same conditions. This concept is covered in the above mentioned copending application however it is an object and feature of this invention to provide an improved network for use in combination with a yieldable material such as an elastomeric material.

A more specific object and feature of the instant invention to provide an energy absorbing assembly including yieldable means and network means disposed at least partially within said yieldable means with the network means including a plurality of spaced elongated means, link means for connecting adjacent elongated means, and joint means for facilitating relative angular movement therebetween.

It is another object and feature of the instant invention to provide an energy absorbing assembly wherein the elongated means and the link members define a plurality of collapsible compartments which collapse in response to an applied force as said joint means facilitates angular movement therebetween thereby to compress the yieldable means within the collapsible compartments for absorbing energy.

Other objects and attendant advantages of the instant invention will be readily appreciated as the same becomes better understood by reference to the following detailed description when considered in connection with the accompanying drawings wherein:

FIG. 1 is a cross-sectional plan view of one embodiment constructed in accordance with the instant invention;

FIG. 2 is a cross-sectional view along line 2—2 of FIG. 1;

Figure 3:
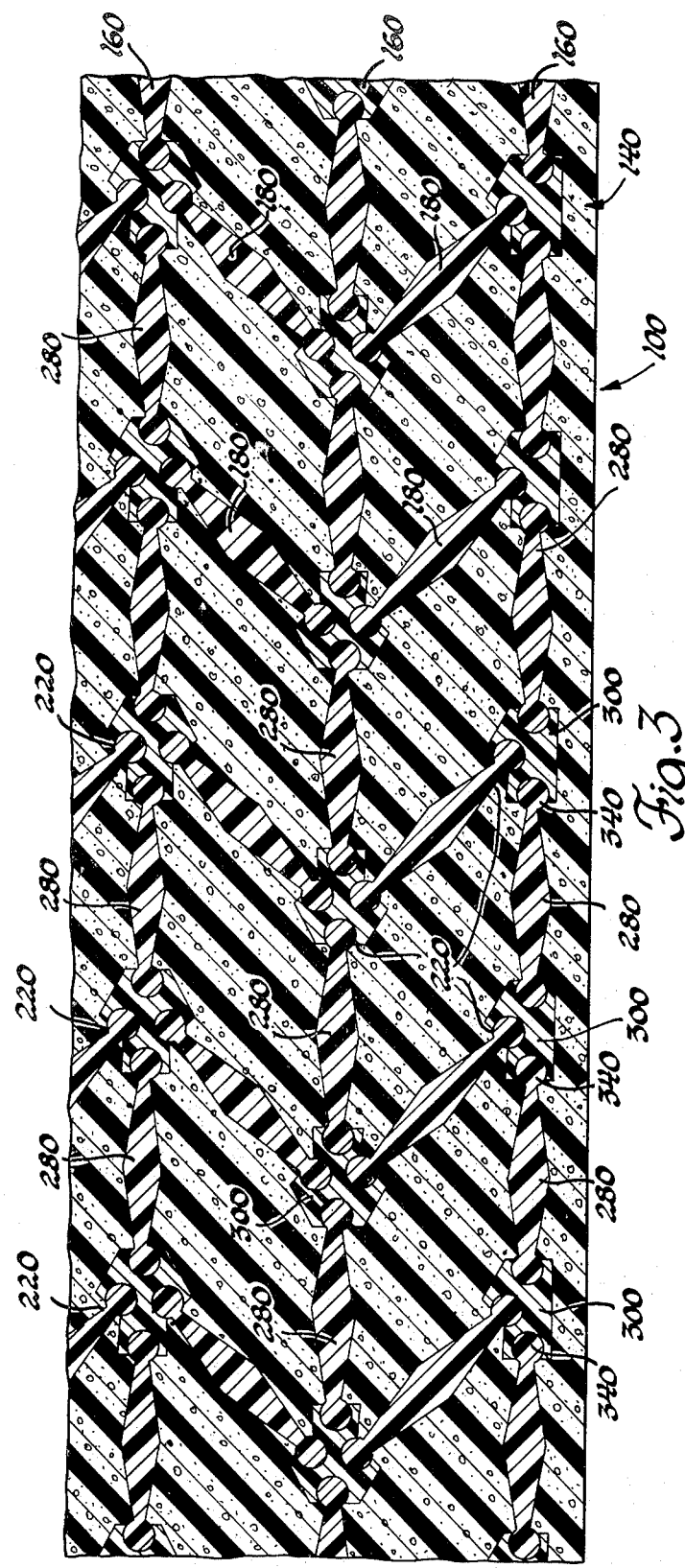
FIG. 3 is a cross-sectional plan view of a second embodiment constructed in accordance with the instant invention.

Referring to the drawings an energy absorbing assembly is generally shown at 10 in FIGS. 1 and 2 and at 100 in FIG. 3. It is noted that the energy absorbing assembly is particularly suited for use with a vehicle bumper; however, it can also be used as a crash pad or any other use wherein it is desirable to dissipate energy resulting from an applied force. The energy absorbing assembly 10 as shown in FIGS. 1 and 2 includes yieldable means 12 comprising an elastomeric material. The elastomeric material is molded to any desired configuration required, for example to protect a vehicle against the force of an impact. In other words, the elastomeric material may be molded to any well known bumper configuration.

Network means generally indicated at 14 is disposed within the yieldable means 12 for distributing the energy of an applied force through the yieldable means 12 and more specifically throughout a substantially large volume of the yieldable means although the force is applied to a relatively small surface area thereof. That is to say, the energy is absorbed by a larger volume of material than would normally come into play without the network means 14. The network means 14 includes a plurality of spaced elongated means 16 and link member 18 for connecting adjacent elongated means 16. The elongated means comprises substantially parallel walls which run longitudinally through the elastomeric material and, therefore, is generally perpendicular to any external force applied to the assembly. The network means 14 is molded entirely within the elastomeric material, such that the surfaces of the elastomeric material disposed externally of the network means 14 provides the contact surfaces with which an external object will engage in the event of a collision. In other words, the elastomeric material external of the network 14 constitutes the impact surface which receives the initial shock of the collision.

The link members 18 are connected to the elongated means 16 at an acute angle relative thereto and each of the elongated means 16 have the link members 18 associated therewith extending in the same general direction longitudinally thereof. That is, each of the elongated means 16 have the link members 18 extending from each side thereof and taking on the general appearance of a fishbone structure. In the embodiment shown in FIGS. 1 and 2 the elongated means 16 comprises elongated strips of plastic and the link members 18 are similarly made of plastic; however, it is to be understood that any type of resilient material may be used to produce the network means 14 provided that it has sufficient resiliency and is not brittle or unbendable, these requirements becoming more clearly understood hereinafter.

The combination of the elongated means 16 and the link members 18 define a plurality of collapsible compartments which collapse in response to an applied force wherein the yieldable means 12 which is disposed within the collapsible compartments is compressed therein, and thereby absorbing energy. The energy absorbing function is substantially due to the compression of the resilient means 12 within the collapsing compartment, therefore, it is important that the network means 14 is capable of collapsing for the purpose of compressing the resilient means 12 therein and also for distributing the energy of the applied force throughout a large volume of the yieldable means 12. To accommodate this function joint means is provided which is generally indicated at 20 to facilitate the collapse of the compartment.

In the event that a vehicle equipped with the subject energy absorbing bumper 10 is involved in a collision wherein a force is applied to the bumper 10 through an impact the elongated means 16 tends to move together thereby compressing the resilient means 12 therebetween. The link members 18 connecting the adjacent elongated means 16 restricts the movement of the resilient means within the compartments and the joint means 20 promotes relative angular movement of the link member 18 with respect to the elongated means 16 thereby allowing the elongated means 16 to move toward each other to compress the resilient means 12 therebetween and to absorb energy. If the network means 14 were rigidly constructed, that is, without the ability to pivot or to move angularly thereby preventing the collapse of the compartments the network means would stiffen the resilient means 12 to such an extent that it would no longer be capable of absorbing the energy of the impact. Furthermore, the network means 14 would be taking the brunt of the force rather than distributing the energy through the resilient means 12.

The joint means, as shown in FIGS. 1 and 2, includes a bendable neck-downed portion having a cross-sectional area substantially less than that of the link members 18. In other words, the joint between the link member 18 and the elongated means 16 is weakened to allow the link member 18 to move angularly or pivot with respect to the elongated means 16. Alternatively, the region of the link member 18 immediately adjacent the elongated means 16 may be weakened by any suitable mannner, such as perforations or the like, the only requirement being that the joint means facilitates angular movement of the link member 18 with respect to the elongated means 16. In this embodiment of the instant invention the network means 14 is made as a single unit, that is, the link members 18 and the elongated means 16 comprising the elongated walls are formed integrally.

Figure 5:
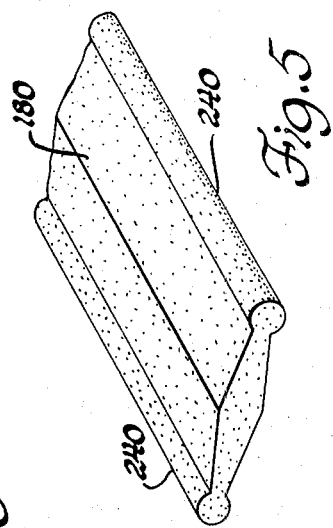
FIG. 5 is a perspective view partially broken away of a disassembled element of the instant invention of FIG. 3
Figure 4:
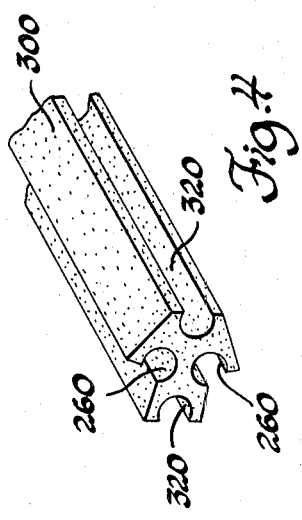
FIG. 4 is a perspective view partially broken away of a disassembled element of the instant invention.

An alternative embodiment of the instant invention is shown generally at 100 in FIGS. 3 through 5 and utilizes joint means comprising a cylinder and channel connection 220. In other words, the link members 180 include cylinders or rods 240 disposed at each end thereof which are rotatably held within cylindrical channels 260 in portions of the elongated means 160. The cylinder and channel connections 220 enable free angular movement between the elongated means 160 and the link members 180.

In the alternate embodiment of the instant invention the elongated means 160 includes a series of stringer members 280 and connecting means 300 for interconnecting the stringer members 280. The connecting means 300 include cylindrical channels 320 for receiving cylinders or rods 340 on the stringer members 280. The connecting means 300 comprises posts which also include the channels 260 for receiving the rods 240 on the link elements 180. As shown in FIG. 3 the stringer members 280 and the link members 180 may have substantially identical structures thereby making the network means 140 an easily assembled construction of structurally similar parts. The link members 180, the stringer members 280, and the connecting elements 300 are preferrably made of plastic.

Similar to the first embodiment 10 of the subject energy absorbing assembly, the link members 180 of the second embodiment are connected to the elongated means 160 at an acute angle relative thereto and each of the elongated means 160 has the link members 16 associated therewith extending in the same general direction longitudinally thereof forming a substantially fishbone structure.

The invention has been described in an illustrative manner and it is to be understood that the terminology which has been used is intended to be in the nature of words of description rather than limitation.

Obviously, many modifications and variations of the present invention are possible in light of the above teachings. It is, therefore, to be understood that the invention may be practices otherwise than as specifically described above within the scope of the appended claims.

The embodiments of the invention in which an exclusive property or privilege is claimed are defined as follows:

1. An energy absorbing assembly comprising: yieldable means and force transmitting network means disposed at least partially within said yieldable means; said network means including a plurality of spaced elongated means, link members for connecting adjacent elongated means, and joint means for facilitating relative angular movement between said link members and said elongated means, said elongated means and said link members having a depth as viewed in plan to define a plurality of collapsible compartments which collapse in response to a force applied in a direction to urge said elongated means toward one another as said joint means facilitates angular movement between said link members and said elongated means, thereby to compress said yieldable means within said collapsible compartments for absorbing energy.

2. An assembly as set forth in claim 1 wherein said joint means includes at least one bendable, weakened portion disposed on said link member.

3. An assembly as set forth in claim 2 wherein said weakened portion comprises a necked-down portion along the depth thereof having a cross-sectional area substantially less that that of said link member.

4. An assembly as set forth in claim 2 including one of said weakended portions disposed on each of said link members at each end thereof immediately adjacent said elongated means.

5. An assembly as set forth in claim 4 wherein each link member is tapered outwardly in an increasing thickness toward the middle from each end thereof as viewed in cross section.

6. An assembly as set forth in claim 5 wherein said link members are connected to said elongated means at an acute angle relative thereto and wherein the link members associated with each of said elongated means extend therefrom in the same general direction longitudinally thereof.

7. An assembly as set forth in claim 6 wherein said elongated means comprises elongated strips of plastic.

8. An assembly as set forth in claim 7 wherein said link members are plastic.

9. An assembly as set forth in claim 8 wherein said yieldable means comprises an elastomeric material.

10. An assembly as set forth in claim 9 wherein said link members and said elongated strips are integral and disposed entirely within the elastomeric material.

11. An assembly as set forth in claim 1 wherein said joint means comprises a cylinder and channel connection means for pivotally interconnecting said link members and said elongated means.

12. An assembly as set forth in claim 11 wherein said cylinder and channel connection means comprises a plurality of cylindrical channels disposed in said elongated means and a cylinder extending from each of said link members and rotatably disposed in one of said channels.

13. An assembly as set forth in claim 12 wherein said elongated means includes a series of stringer members and connecting elements interconnecting said stringer members.

14. As assembly as set forth in claim 13 including additional cylinder and channel connection means for pivotally interconnecting said stringer members and said connecting elements.

15. An assembly as set forth in claim 14 wherein said connecting elements contain said cylindrical channels and the cylinders extending from both said link members and said stringer members are disposed therein.

16. An assembly as set forth in claim 15 wherein said link members and said stringer members are substantially identical.

17. An assembly as set forth in claim 16 wherein said link members, said stringer members, and said connecting elements are plastic.

18. An assembly as set forth in claim 17 wherein said yieldable means comprises an elastomeric material.

19. An assembly as set forth in claim 18 wherein said network means is disposed entirely within said elastomeric material.

20. An assembly as set forth in claim 19 wherein said link members are connected to said elongated means at an acute angle relative thereto and wherein the link members associated with each of said elongated means extend therefrom in the same general direction longitudinally thereof.

21. A device comprising; force transmitting network means including at least two elongated plate-like members in substantially parallel spaced relationship, link members connecting said elongated members at spaced positions therealong, and articulated joint means connecting said elongated members and said link members for facilitating relative angular movement therebetween.

22. A device as set forth in claim 21 wherein said joint means includes a weakened portion disposed on said link member adjacent said elongated means.

23. A device as set forth in claim 22 wherein said weakened portion comprises a necked-down portion having a cross sectional area substantially smaller than that of said link member.

24. A device as set forth in claim 21 wherein said joint means includes a cylinder and channel connection means.

25. A device as set forth in claim 24 wherein said cylinder and channel connection means comprises a plurality of cylindrical channels disposed in said elongated member and a cylinder extending from each of said link members and rotatably disposed in one of said channels.

26. A device as set forth in claim 25 wherein said elongated member includes a plurality of stringer members, connecting elements interconnecting said stringer members.

27. An assembly as set forth in claim 26 including additional cylinder and channel connection means for pivotally interconnecting said stringer members and said connecting elements.

28. An assembly as set forth in claim 27 wherein said connecting elements contain said cylindrical channels and the cylinders extending from both said link members and said stringer members are disposed therein.

29. A device as set forth in claim 28 wherein said link members and said stringer members are substantially identical.

* * * * *